US 11,269,812 B2

(12) United States Patent
Fox et al.

(10) Patent No.: US 11,269,812 B2
(45) Date of Patent: Mar. 8, 2022

(54) DERIVED RELATIONSHIP FOR COLLABORATION DOCUMENTS

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Liam S. Harpur, Dublin (IE); Jonathan D. Dunne, Dungarvan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 258 days.

(21) Appl. No.: 16/408,716

(22) Filed: May 10, 2019

(65) Prior Publication Data
US 2020/0356531 A1 Nov. 12, 2020

(51) Int. Cl.
*G06F 16/176* (2019.01)
*G06F 3/14* (2006.01)
(Continued)

(52) U.S. Cl.
CPC .............. *G06F 16/176* (2019.01); *G06F 3/14* (2013.01); *G06F 40/205* (2020.01); *H04L 67/42* (2013.01)

(58) Field of Classification Search
CPC ........ G06F 16/176; G06F 3/14; G06F 40/205; G06F 16/3334; G06F 16/9538; G06F 16/374; G06F 16/319; G06F 3/0484; G06F 3/0482; G06F 3/0488; G06F 17/16; G06F 17/30604; G06F 17/30864; G06F 17/3097; G06F 17/30867; G06F 17/30321; G06F 17/2785; G06F 16/93; G06F 16/288;
(Continued)

(56) References Cited

U.S. PATENT DOCUMENTS 7,007,069 B2 * 2/2006 Newman ............... G06F 16/353
709/206
7,085,755 B2 8/2006 Bluhm
(Continued)

FOREIGN PATENT DOCUMENTS

JP 2017073137 A 4/2017

OTHER PUBLICATIONS

Mell et al., "The NIST Definition of Cloud Computing," Recommendations of the National Institute of Standards and Technology, NIST Special Publication 800-145, Sep. 2011, pp. 1-7.

*Primary Examiner* — Steven P Sax
(74) *Attorney, Agent, or Firm* — Caleb D. Wilkes (57) ABSTRACT

A method, computer system, and computer program product for collaborative document relations modeling are provided. The embodiment may include parsing, by a processor, a document corpus utilizing topic modeling and distance analysis techniques. The embodiment may also include deriving a collaborative document relational model to combine the results of the parsing into a matrix. The embodiment may further include grouping content of the parsed document corpus through document clustering utilizing the generated collaborative document relational model. The embodiment may also include displaying the grouped content as document clusters in a graphical user interface of a document management application.

17 Claims, 7 Drawing Sheets

(51) Int. Cl.
*G06F 40/205* (2020.01)
*H04L 67/01* (2022.01)

(58) Field of Classification Search
CPC ...... G06F 16/245; G06F 16/22; G06F 17/212; G06F 17/248; G06Q 10/10; H04L 67/42
See application file for complete search history.

(56) References Cited

U.S. PATENT DOCUMENTS

| | | | | |
|---|---|---|---|---|
| 7,302,645 | B1 * | 11/2007 | Henzinger | G06F 16/951 715/738 |
| 7,458,014 | B1 * | 11/2008 | Rubin | G06F 3/0488 709/206 |
| 7,809,714 | B1 * | 10/2010 | Smith | G06F 16/2425 707/713 |
| 7,853,485 | B2 | 12/2010 | Song | |
| 8,321,357 | B2 * | 11/2012 | Lapir | G06F 40/20 706/12 |
| 8,527,522 | B2 * | 9/2013 | Baron | G06F 40/295 707/749 |
| 8,700,627 | B2 | 4/2014 | Knight | |
| 8,725,736 | B2 | 5/2014 | Gallivan | |
| 8,996,350 | B1 * | 3/2015 | Dub | G06F 16/35 704/1 |
| 9,043,197 | B1 | 5/2015 | Pasca | |
| 9,104,760 | B2 | 8/2015 | Hadley | |
| 9,142,048 | B2 * | 9/2015 | Evans | G06F 16/358 |
| 9,384,573 | B2 * | 7/2016 | Evans | G06F 16/35 |
| 9,406,239 | B2 * | 8/2016 | Spagnola | G09B 7/08 |
| 9,678,618 | B1 * | 6/2017 | Schrock | G06F 16/954 |
| 10,361,802 | B1 * | 7/2019 | Hoffberg-Borghesani | G11B 27/11 |
| 10,867,124 | B2 * | 12/2020 | DeVoe | G06F 40/106 |
| 2004/0090472 | A1 * | 5/2004 | Risch | G06F 16/9038 715/853 |
| 2006/0184481 | A1 * | 8/2006 | Zhang | G06F 16/313 706/45 |
| 2006/0200253 | A1 * | 9/2006 | Hoffberg | G05B 15/02 700/19 |
| 2006/0218140 | A1 * | 9/2006 | Whitney | G06F 16/338 |
| 2008/0072179 | A1 * | 3/2008 | Anwar | G06F 16/951 715/856 |
| 2008/0109762 | A1 * | 5/2008 | Hundal | G06F 16/38 715/855 |
| 2010/0161611 | A1 | 6/2010 | Guo | |
| 2012/0179634 | A1 * | 7/2012 | Chen | G06F 16/35 706/12 |
| 2012/0331404 | A1 * | 12/2012 | Buford | G06Q 10/10 715/757 |
| 2013/0246430 | A1 * | 9/2013 | Szucs | G06F 16/313 707/738 |
| 2013/0332475 | A1 * | 12/2013 | Michelstein | G06F 16/23 707/756 |
| 2014/0059423 | A1 | 2/2014 | Gorga | |
| 2014/0172417 | A1 * | 6/2014 | Monk, II | G06F 40/30 704/9 |
| 2016/0188143 | A1 * | 6/2016 | Kohlmeier | G06F 3/0482 715/753 |
| 2016/0203209 | A1 | 7/2016 | Clinchant | |
| 2016/0357366 | A1 * | 12/2016 | Migos | G06T 13/00 |
| 2017/0228445 | A1 * | 8/2017 | Chiu | G06F 16/248 |
| 2017/0262526 | A1 | 9/2017 | Gallivan | |
| 2017/0357717 | A1 * | 12/2017 | Hughes | G06F 3/0488 |
| 2018/0204111 | A1 * | 7/2018 | Zadeh | G06N 3/0436 |
| 2018/0246973 | A1 * | 8/2018 | Zhao | G06F 16/9535 |
| 2018/0246974 | A1 * | 8/2018 | Shukla | G06F 16/9535 |
| 2019/0012405 | A1 * | 1/2019 | Contractor | G06F 16/9024 |
| 2019/0171647 | A1 * | 6/2019 | Gaddipati | G06F 16/252 |
| 2019/0205391 | A1 * | 7/2019 | Dobrynin | G06F 16/245 |
| 2019/0266257 | A1 * | 8/2019 | Natchu | G06F 16/95 |
| 2019/0266283 | A1 * | 8/2019 | Shukla | G06F 16/9535 |
| 2019/0266288 | A1 * | 8/2019 | Shukla | G06F 16/24578 |
| 2019/0325062 | A1 * | 10/2019 | Rogulenko | G06F 16/2343 |
| 2020/0026772 | A1 * | 1/2020 | Wheeler | G06F 16/9535 |
| 2020/0073916 | A1 * | 3/2020 | Fox | G06F 40/103 |
| 2020/0133967 | A1 * | 4/2020 | Shukla | G06F 16/9538 |
| 2020/0134019 | A1 * | 4/2020 | Podgorny | G06F 16/24575 |
| 2020/0302351 | A1 * | 9/2020 | Clark | G06F 9/453 |
| 2020/0342016 | A1 * | 10/2020 | Morris | G06F 40/30 |

\* cited by examiner

DERIVED RELATIONSHIP FOR COLLABORATION DOCUMENTS

BACKGROUND

The present invention relates, generally, to the field of computing, and more particularly to document collaboration systems.

Document collaboration systems are the tools or systems that enable multiple individuals to work collaboratively on a single document to achieve a single final version. Document collaboration systems usually require software that enables multiple individuals to work on a document from different computer terminals or devices that are remotely located. Different individuals may work on a single document from different locations via the internet or cloud-based document collaboration systems. Document collaboration systems may indicate or identify other users when the other users are actively editing a document owned by another user. Document collaboration systems may also keep track of the history of edits or provide a search function so that the systems may act as a search engine to find what users may want to find in a particular version of a document.

SUMMARY

According to one embodiment, a method, computer system, and computer program product for collaborative document relations modeling are provided. The embodiment may include parsing, by a processor, a document corpus utilizing topic modeling and distance analysis techniques. The embodiment may also include deriving a collaborative document relational model to combine the results of the parsing into a matrix. The embodiment may further include grouping content of the parsed document corpus through document clustering utilizing the generated collaborative document relational model. The embodiment may also include displaying the grouped content as document clusters in a graphical user interface of a document management application.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to document collaboration systems. The following described exemplary embodiments provide a system, method, and program product to perform topic analysis and content distance analysis on a document corpus and derive a collaborative document relational model (CDRM) based on the analysis. Therefore, the present embodiment has the capacity to improve the technical field of document collaboration systems by grouping content of documents via document clustering using the generated CDRM and determining relationships between documents or sorting out chains of related documents, thereby allowing users to determine what documents may be duplicative of another document and provide a new user with an order of collaborative documents to be worked on.

As previously described, document collaboration systems are the tools or systems that enable multiple individuals to work collaboratively on a single document to achieve a single final version. Document collaboration systems usually require software that enables multiple individuals to work on a document from different computer terminals or devices that are remotely located. Different individuals may work on a single document from different locations via the internet or cloud-based document collaboration systems. Document collaboration systems may indicate or identify other users when the other users are actively editing a document owned by another user. Document collaboration systems may also keep track of the history of edits or provide a search function so that the systems may act as a search engine to find what users may want to find in a particular version of a document.

Collaborative documentation and storage may be seen as a convenient way to share and collaborate on multiple document types with multiple groups. However, problems may arise when new members join an existing collaborative cohort. For example, when new users work on a collaborative document, there may be other documents that are related to a current document and without any relational framework to collaborate, the new user would have difficulties in finding the related documents. Although many question-and-answer websites or networks utilize techniques to check for duplication of questions upon their entries in the realm of fora-based documents, these techniques have little to do with determining relations for collaborative-based document creation and storage. As such, it may be advantageous to, among other things, implement a system capable of modeling document content within a collaborative document environment and providing a system that generates affinities between documents so that users may read and collaborate not only on a single document but also on related documents without having to spend extra time finding the related documents by themselves.

According to one embodiment, a collaborative document relations modeling program may parse a document corpus using topic modeling and distance analysis to derive a collaborative document relational model that may combine results of the parsing into a matrix. In at least one other embodiment, the collaborative document relations modeling program may group content of the parsed document through document clustering using the model. According to one other embodiment, the collaborative document relations modeling program may display the grouped content as document clusters in a graphical user interface of a document management application.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for parsing a document corpus and generating a collaborative document relational model.

Figure 1:
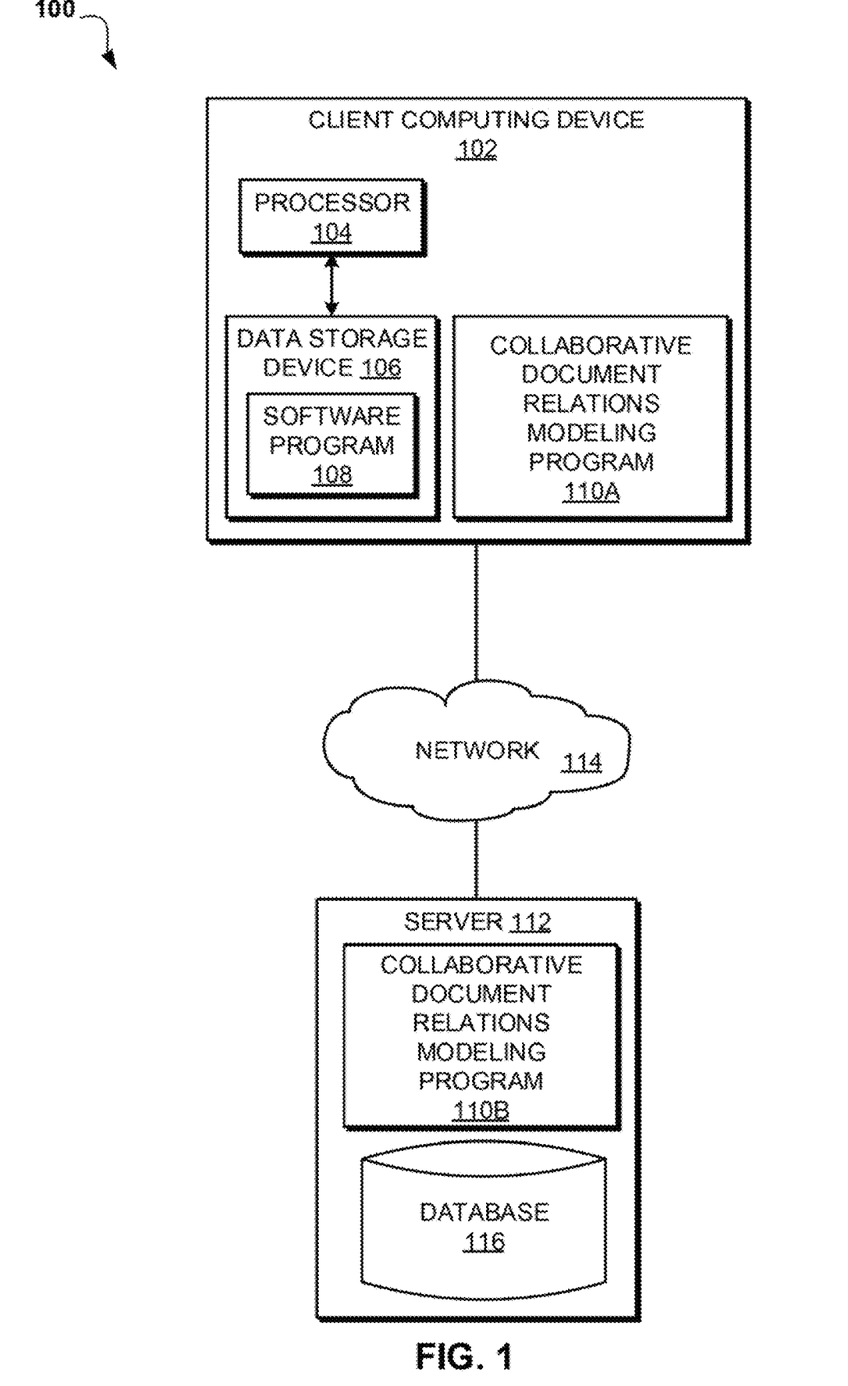
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a collaborative document relations modeling program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a collaborative document relations modeling program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the collaborative document relations modeling program 110A, 110B may be a program capable of performing topic analysis and content distance analysis of a document corpus. The collaborative document relations modeling program 110A, 110B may also combine the results of the analysis in the form of a matrix to provide a model representing corpus relationships. The collaborative document relations modeling program 110A, 110B may further utilize the model to group content of the documents based on their similarity and content type. The collaborative document relations modeling process is explained in further detail below with respect to FIG. 2.

Figure 2:
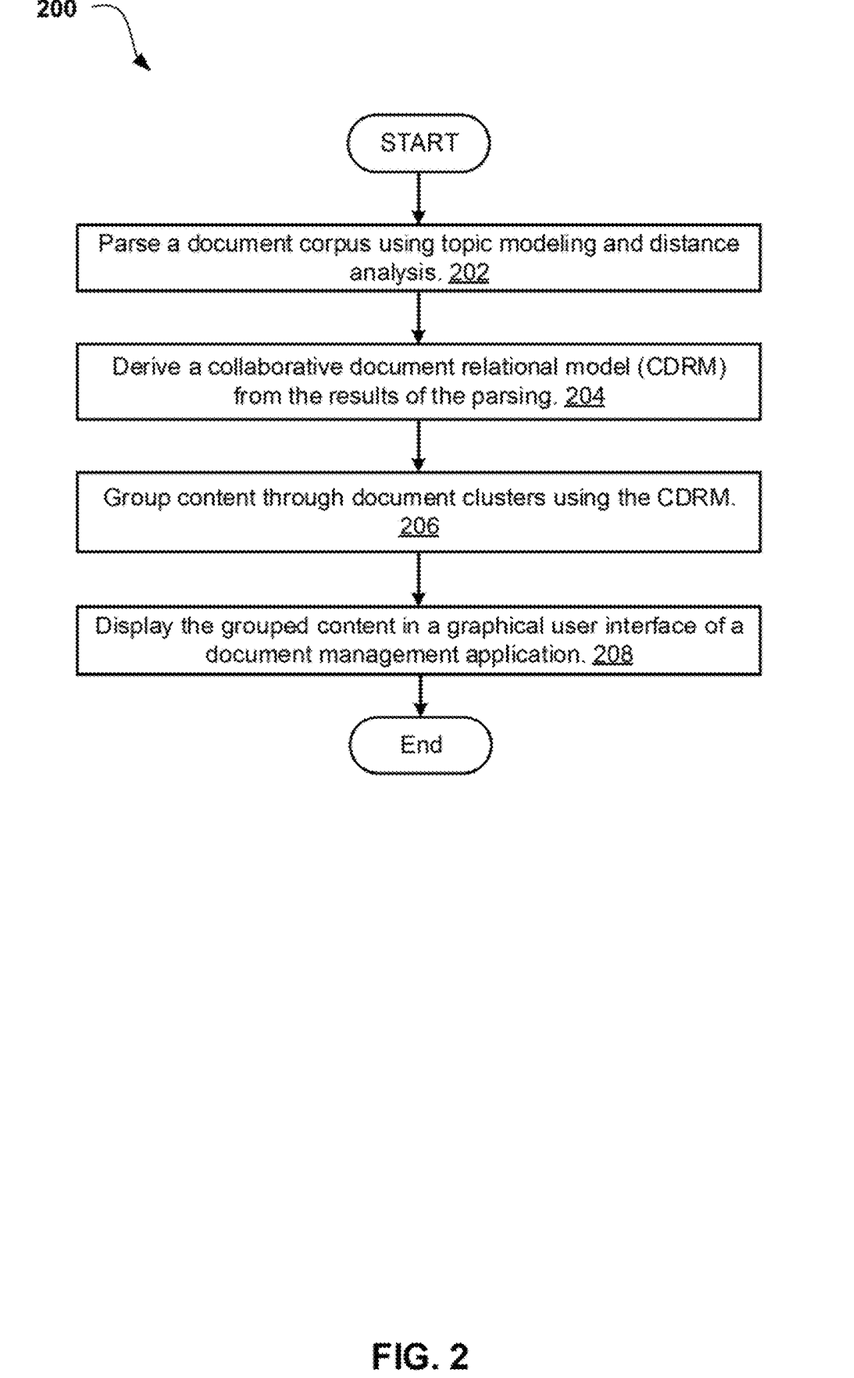
FIG. 2 is an operational flowchart illustrating a collaborative document relations modeling process according to at least one embodiment.

FIG. 2 is an operational flowchart illustrating a collaborative document relations modeling process 200 according to at least one embodiment. At 202, the collaborative document relations modeling program 110A, 110B parses a document corpus using topic modeling and distance analysis. According to one embodiment, the collaborative document relations modeling program 110A, 110B may ingest a collaborative document from a document collaboration platform connected to the server 112. The collaborative document relations modeling program 110A, 110B may ingest documents, such as word processing or text documents, spreadsheets, presentations, images, PDFs, videos, or maps. The collaborative document relations modeling program 110A, 110B may also perform topic analysis and analyze content distance of a document corpus. In at least one embodiment, the collaborative document relations modeling program 110A, 110B may utilize existing techniques, such as LDA, Biterm for topic disclosure analysis and GLoVE, word2vec to analyze content distance. The collaborative document relations modeling program 110A, 110B may also utilize a known distance analysis method, such as cosine distance or Jaccard similarity.

At 204, the collaborative document relations modeling program 110A, 110B derives a collaborative document relational model from the results of the parsing. According to one embodiment, the collaborative document relations modeling program 110A, 110B may combine the results of the analysis of the topic modeling and the distance analysis in the form of a matrix to provide a model that represents corpus relationships. For example, the collaborative document relations modeling program 110A, 110B may calculate the cosine difference between different documents to determine how related those documents are. The collaborative document relations modeling program 110A, 110B may utilize topic modeling algorithms to determine key terms in the documents. the collaborative document relations modeling program 110A, 110B may also build up a cartesian map of phrases and utilize word embeddings to determine the cosine difference between two cartesian maps. For example, if there is a term affinity between document A and document B, then the collaborative document relations modeling program 110A, 110B may determine that document B should follow document A. If the collaborative document relations modeling program 110A, 110B determines that there is a loose coupling between the documents, the collaborative document relations modeling program 110A, 110B may determine that there is no relationship between document A and document B.

At 206, the collaborative document relations modeling program 110A, 110B groups content of the collaborative document through document clustering using the generated collaborative document relational model. According to one embodiment, the collaborative document relations modeling program 110A, 110B may utilize the generated collaborative document relational model and the matrix to arrange collaborative documents and related documents by their similarity and content type. For documents that are being shared publicly or by large numbers of users, it may be advantageous to understand the method taken for new users to learn about the affiliations of related documents. The ability to detect success rates for new users may be based on surveys of paths or actions taken by new users when the users are just completing their infancy of assimilation into the usage patterns of related documents implemented by original members of the group that has been working on a collaborative document. In at least one embodiment, the collaborative document relations modeling program 110A, 110B may crowdsource the usage patterns and success or failure rates and update the usage pattern based on the feedback received from the new users, thereby strengthening the generated document relations model.

At 208, the collaborative document relations modeling program 110A, 110B displays the grouped content in a graphical user interface of a document management application. According to one embodiment, the collaborative document relations modeling program 110A, 110B may integrate the document clusters with a document management application through the server 112. In at least one other embodiment, the collaborative document relations modeling program 110A, 110B may contrast a traditional document collaboration view with a graph showing relationships of various documents with an initial anchor document. For example, instead of a collaborative document platform only displaying a list of related documents to be worked on and indicating when the last version was updated or by whom it was updated, the collaborative document relations modeling program 110A, 110B may display a graphical view of document affinities each of which is indicated using different shapes, colors, patterns or graphical representations. The different shapes, colors, patterns, and graphical representations may provide a framework of communications to highlight the relationships of the content and the metadata used for classification. Utilization of such metadata may enable communications to establish clear connections with the content itself and the ability for users to gain a better understanding of said usage.

Figure 3:
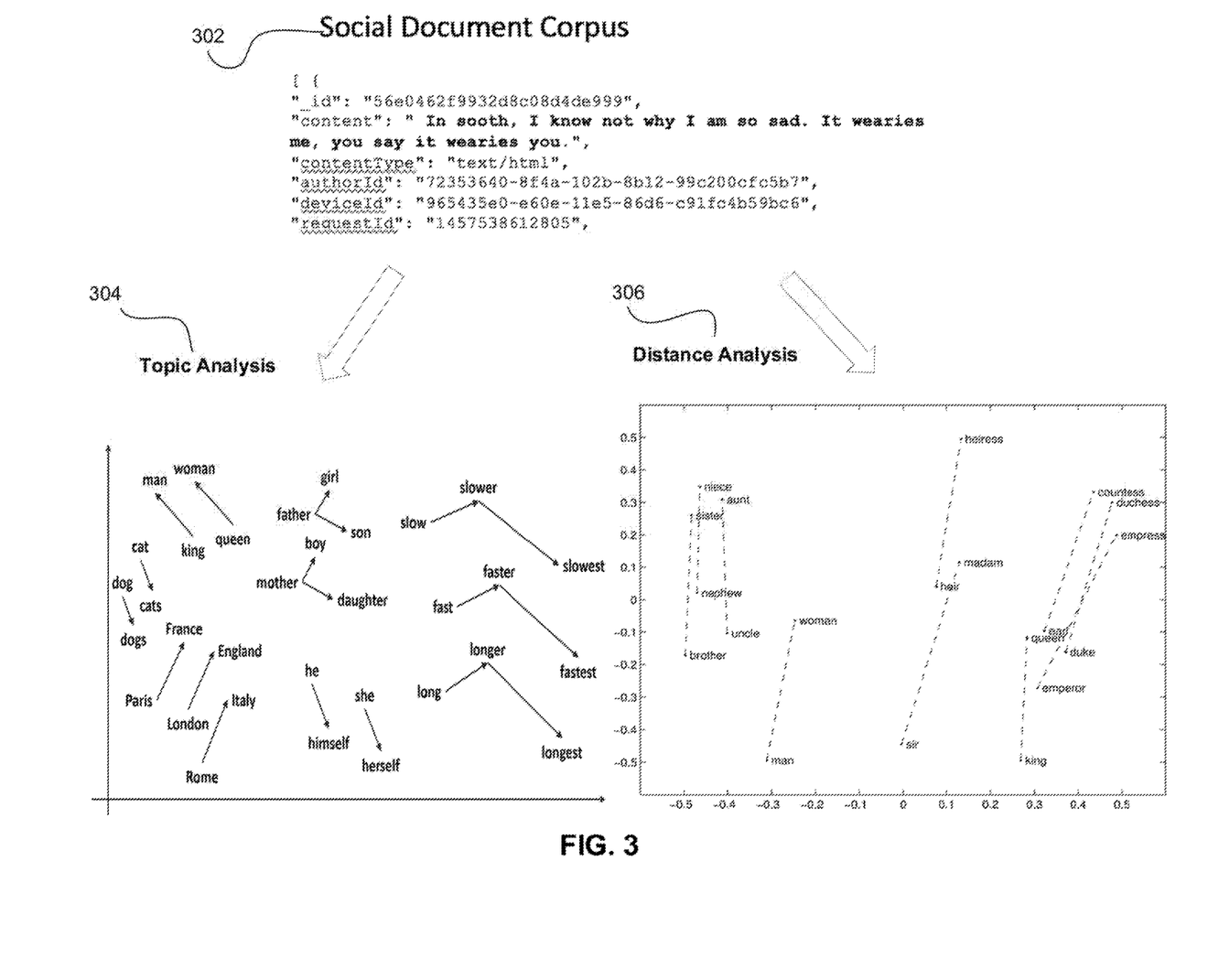
FIG. 3 is a block diagram showing an exemplary topic and distance analysis process using a collaborative document relations modeling platform according to at least one embodiment.

Referring now to FIG. 3, a block diagram showing exemplary topic and distance analysis processes using a collaborative document relations modeling platform are depicted according to at least one embodiment. According to one embodiment, the collaborative document relations modeling program 110A, 110B may parse a social document corpus 302 containing the text, "In sooth, I know not why I am so sad. It wearies me, you say it wearies you." The collaborative document relations modeling program 110A, 110B may parse the social document corpus 302 and extract information, such as content type (e.g. text/HTML), author Id, device ID or request Id. Based on the parsing, the collaborative document relations modeling program 110A, 110B may perform a topic analysis 304 and a distance analysis 306. The collaborative document relations modeling program 110A, 110B may generate and display a graph showing topical relationships of various keywords. For example, a topic analysis graph depicted in FIG. 3 may graphically describe topical relationships between keywords such as "man" and "king" or "long", "longer" and "longest", the collaborative document relations modeling program 110A, 110B may also generate and display a distance analysis graph showing a Euclidian distance between certain keywords in numeric values.

Figure 4:
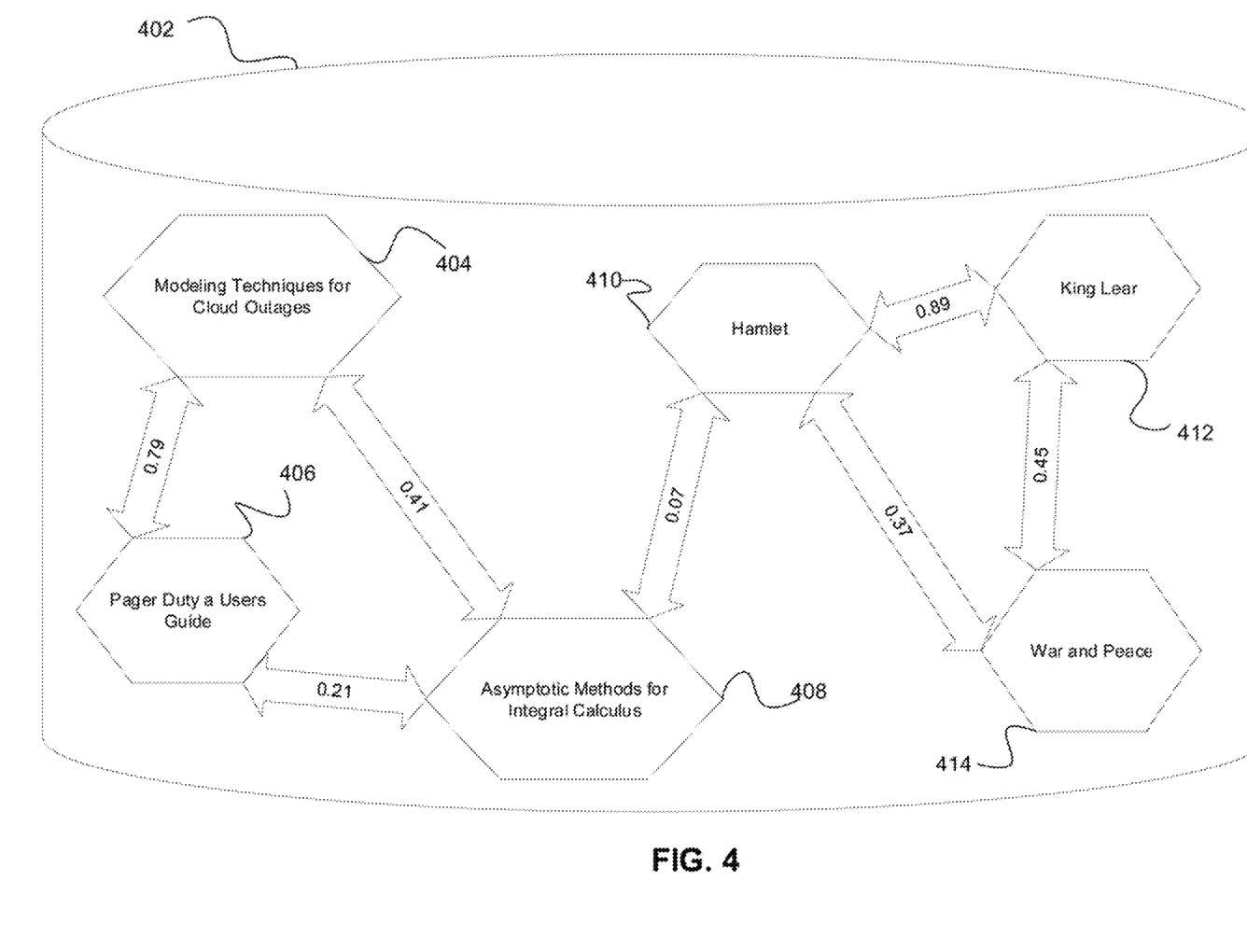
FIG. 4 is a block diagram showing exemplary content groups overlaid with relationship values using a collaborative document relations modeling platform according to at least one embodiment.

Referring now to FIG. 4, a block diagram showing exemplary content groups overlaid with relationship values using a collaborative document relations modeling platform is depicted according to at least one embodiment. The collaborative document relations modeling program 110A, 110B may utilize the results of the topic modeling analysis and distance analysis to group particular content together via document clustering 402. For example, as shown in in FIG. 4, the collaborative document relations modeling program 110A, 110B may cluster collaborative documents and related documents into an anchor topic such as "Modeling Techniques for Cloud Outages" 404, "Pager Duty a Users Guide" 406, "Asymptotic Methods for Integral Calculus" 408, "Hamlet" 410, "King Lear" 412 and "War and Peace" 414. In at least one other embodiment, the collaborative document relations modeling program 110A, 110B may assign relationship values to each relationship of the above anchor topics. For example, the collaborative document relations modeling program 110A, 110B may assign 0.79 to the relationship between "Modeling Techniques for Cloud Outages" 404 and "Pager Duty a Users Guide" 406 and 0.07 to the relationship between "Hamlet" 410 and "Asymptotic Methods for Integral Calculus" 408. According to one other embodiment, the collaborative document relations modeling program 110A, 110B may display relationship values in different colors in accordance with the pre-configured value ranges. For example, the collaborative document relations modeling program 110A, 110B may display relationship values between 0.01 and 0.25 in red, 0.26 and 0.5 in yellow and any values over 0.5 in green so that a user may recognize the strength of relationship between two particular topics when the user may need to review other documents related to an original collaborative document that the user has been working on.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the collaborative document relations modeling program 110A, 110B may generate a relation model based on a collaborative document and determine the respective order of collaboration for the documents related to an original collaborative document.

Figure 5:
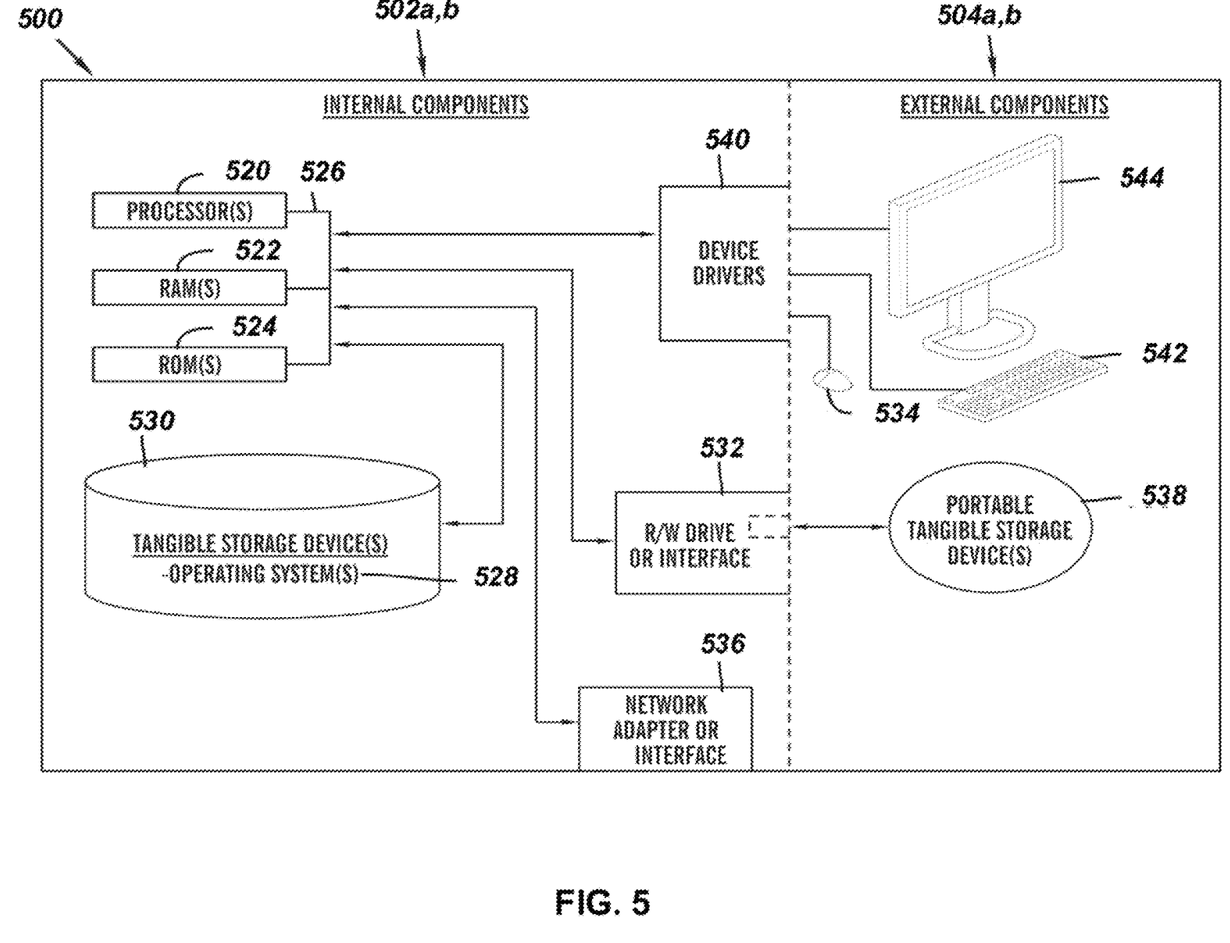
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smartphone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 508 and the collaborative document relations modeling program 110A in the client computing device 102 and the collaborative document relations modeling program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as collaborative document relations modeling program 110A, 110B can be stored on one or more of the respective portable computer-readable tangible storage devices 538, read via the respective R/W drive or interface 532 and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software program 108 and the collaborative document relations modeling program 110A in the client computing device 102 and the collaborative document relations modeling program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the collaborative document relations modeling program 110A in the client computing device 102 and the collaborative document relations modeling program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
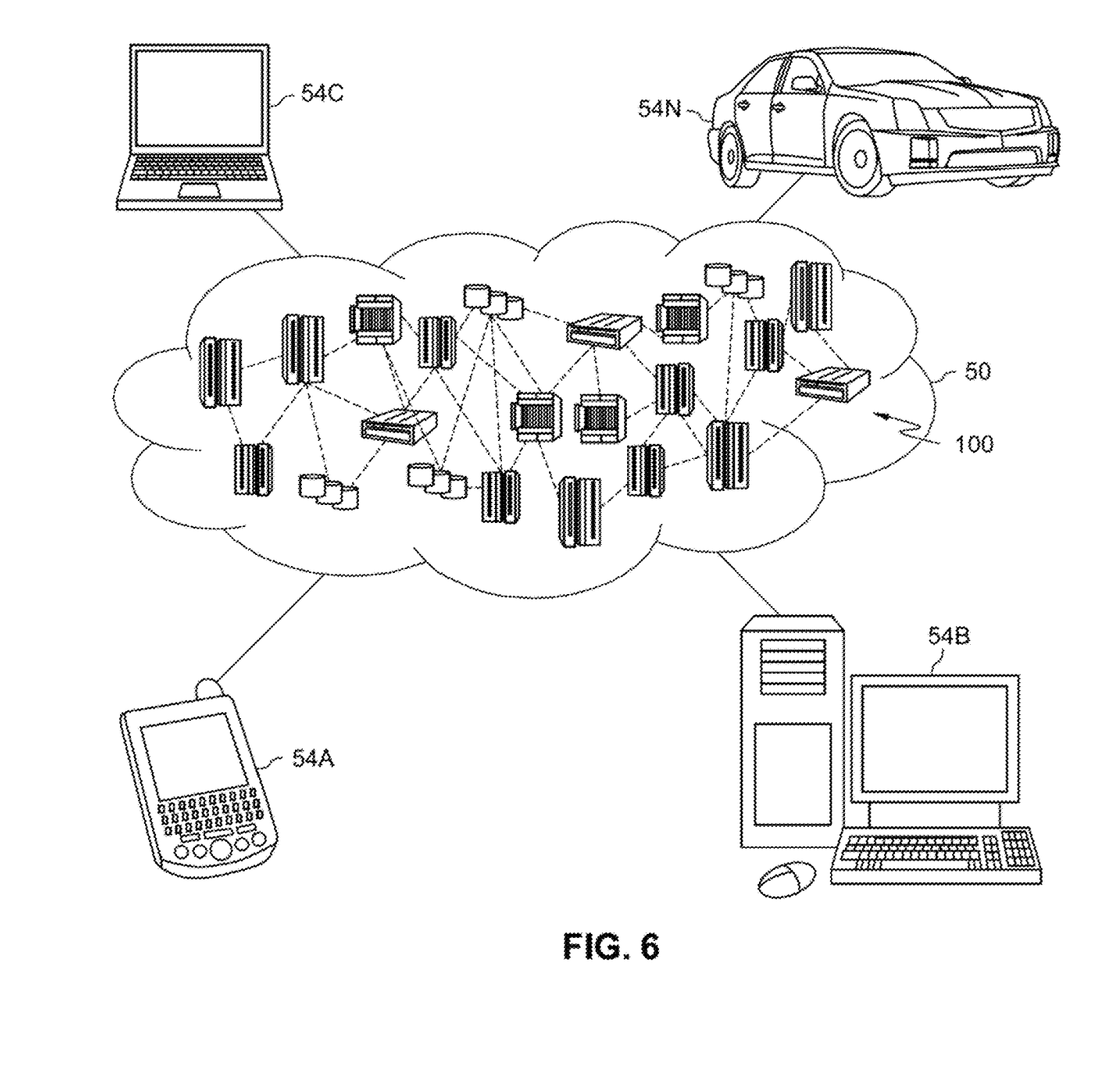
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
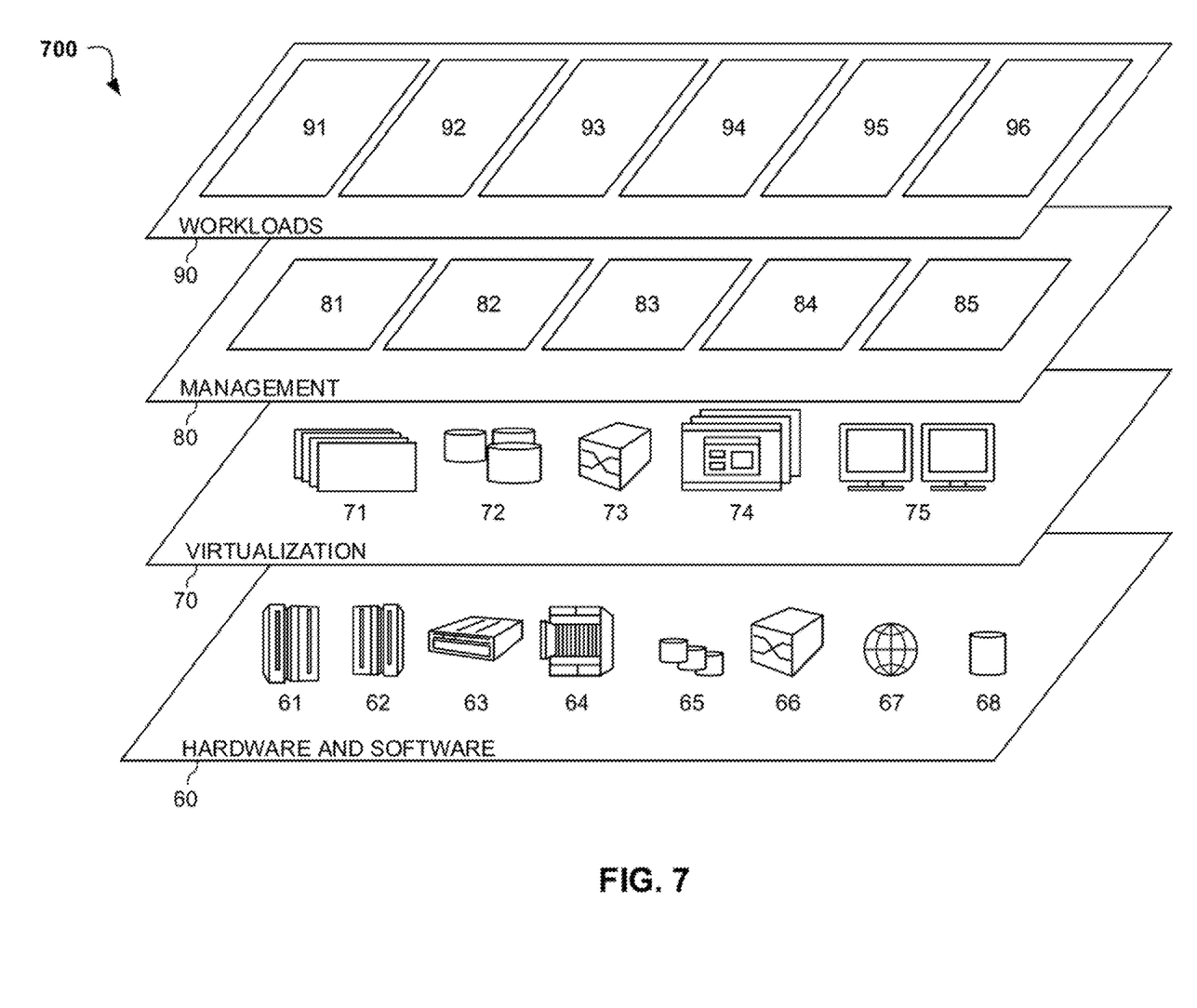
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative document relations modeling 96. Collaborative document relations modeling 96 may relate to deriving a collaborative document relational model from a collaborative document and all related documents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for collaborative document relations modeling, the method comprising:

parsing, by a processor, a document corpus comprising collaborative documents, the parsing utilizing topic modeling and distance analysis techniques;

deriving a collaborative document relational model to combine results of the parsing into a matrix;

building, via the collaborative document relational model, a respective cartesian map for the collaborative documents;

determining, via the built cartesian maps, differences of the collaborative documents;

grouping content of the parsed document corpus through document clustering utilizing the derived collaborative document relational model and utilizing the differences, displaying the grouped content as document clusters in a graphical user interface of a document management application, the document clusters including an initial anchor document and showing relationships between various documents of the collaborative documents to the initial anchor document, the new user having accessed the initial anchor document;

crowdsourcing usage patterns of related collaborative documents of the document corpus, the crowdsourcing being implemented by previous members of a collaborating group;

updating the collaborative document relational model and the document clusters to incorporate the usage patterns;

surveying a navigation of a new user as the new user navigates the document clusters, the surveying measuring a success rate for the new user to complete an assimilation into the usage patterns;

further updating the collaborative document relational model and the document clusters based on the surveying; and displaying the further updated collaborative document relational model and document clusters in the graphical user interface.

2. The method of claim 1, further comprising:
ingesting the document corpus from a document collaboration platform.

3. The method of claim 1, wherein the deriving of the collaborative document relational model comprises:
calculating cosine differences of topics found in the document corpus to determine relationships between the topics.

4. The method of claim 1, wherein the topic modeling determines key terms in the document corpus, the key terms being part of the results of the parsing.

5. The method of claim 1, wherein the graphical user interface comprises the document clusters being integrated with existing document management applications as a form of a visual overlay.

6. A computer system for collaborative document relations modeling, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

parsing a document corpus comprising collaborative documents, the parsing utilizing topic modeling and distance analysis techniques;

deriving a collaborative document relational model to combine results of the parsing into a matrix;

building, via the collaborative document relational model, a respective cartesian map for the collaborative documents;

determining, via the built cartesian maps, differences of the collaborative documents;

grouping content of the parsed document corpus through document clustering utilizing the derived collaborative document relational model and utilizing the differences;

displaying the grouped content as document clusters in a graphical user interface of a document management application, the document clusters including an initial anchor document and showing relationships of various documents of the collaborative documents to the initial anchor document, the new user having accessed the initial anchor document;

crowdsourcing usage patterns of related collaborative documents of the document corpus, the crowdsourcing being implemented by previous members of a collaborating group;

updating the collaborative document relational model and the document clusters to incorporate the usage patterns;

surveying a navigation of a new user as the new user navigates the document clusters, the surveying measuring a success rate for the new user to complete an assimilation into the usage patterns;

further updating the collaborative document relational model and the document clusters to incorporate the usage patterns and based on the surveying; and displaying the further updated collaborative document relational model and document clusters in the graphical user interface.

7. The computer system of claim 6, wherein the method further comprises:
ingesting the document corpus from a document collaboration platform.

8. The computer system of claim 6, wherein the deriving of the collaborative document relational model comprises:
calculating cosine differences of topics found in the document corpus to determine relationships between the topics.

9. The computer system of claim 6, wherein the topic modeling determines key terms in the document corpus, the key terms being part of the results of the parsing.

10. The computer system of claim 6, wherein the graphical user interface comprises the document clusters being integrated with existing document management applications as a form of a visual overlay.

11. A computer program product for collaborative document relations modeling, the computer program product comprising:
one or more computer-readable tangible storage media and program instructions stored on at least one of the one or more non-transitory tangible storage media, the program instructions executable by a processor of a computer to perform a method, the method comprising:

parsing a document corpus comprising collaborative documents utilizing topic modeling and distance analysis techniques;

deriving a collaborative document relational model to combine results of the parsing into a matrix;

building, via the collaborative document relational model, a respective cartesian map for the collaborative documents;

determining, via the built cartesian maps, differences of the collaborative documents;

grouping content of the parsed document corpus through document clustering utilizing the derived collaborative document relational model and utilizing the differences; and displaying the grouped content as document clusters in a graphical user interface of a document management application, the document clusters including an initial anchor document and showing relationships of various documents of the collaborative documents to the initial anchor document, the new user having accessed the initial anchor document;

crowdsourcing usage patterns of related collaborative documents of the document corpus, the crowdsourcing being implemented by previous members of a collaborating group;

updating the collaborative document relational model and the document clusters to incorporate the usage patterns;

surveying a navigation of a new user as the new user navigates the document clusters, the surveying measuring a success rate for the new user to complete an assimilation into the usage patterns;

updating the collaborative document relational model and the document clusters based on the surveying; and displaying the further updated collaborative document relational model and document clusters in the graphical user interface.

12. The computer program product of claim 11, wherein the method further comprises:

ingesting the document corpus from a document collaboration platform.

13. The computer program product of claim 11, wherein the deriving of the collaborative document relational model comprises:

calculating cosine differences of topics found in the document corpus to determine relationships between the topics.

14. The computer program product of claim 11, wherein the topic modeling determines key terms in the document corpus, the key terms being part of the results of the parsing.

15. The method of claim 1, wherein the differences of the collaborative documents are cosine differences.

16. The method of claim 1, further comprising:

crowdsourcing a failure rate of the generated collaborative document relational model; and further updating the generated collaborative document relational model based on the crowdsourced failure rate.

17. The method of claim 1, wherein the document clusters in the graphical user interface comprise document affinities that are displayed by at least one member selected from a group consisting of different shapes, different colors, different patterns, and different graphical representations.

* * * * *